US006728609B2

(12) United States Patent
Murray et al.

(10) Patent No.: US 6,728,609 B2
(45) Date of Patent: Apr. 27, 2004

(54) DIAGNOSTIC METHOD AND SYSTEM FOR A MULTIPLE-LINK STEERING SYSTEM

(75) Inventors: Patrick Murray, Cork (IE); David A. Jackson, Point Roberts, WA (US); Stephen L. Glickman, Los Gatos, CA (US); James L. Dale, Jr., Conway, AR (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 5 days.

(21) Appl. No.: 10/243,951

(22) Filed: Sep. 16, 2002

(65) Prior Publication Data

US 2004/0054451 A1 Mar. 18, 2004

(51) Int. Cl.$^7$ .................. G01M 17/013; G01M 17/04; G01B 11/26
(52) U.S. Cl. ........................ 701/29; 701/37; 356/138
(58) Field of Search .................. 701/29, 30, 34, 701/37; 356/138

(56) References Cited

U.S. PATENT DOCUMENTS

| 4,745,469 A | 5/1988 | Waldecker et al. |
| 4,761,749 A | 8/1988 | Titsworth et al. |
| 4,899,218 A | 2/1990 | Waldecker et al. |
| 5,024,001 A | 6/1991 | Borner et al. |
| 5,519,488 A | 5/1996 | Dale, Jr. et al. |
| 5,531,030 A | 7/1996 | Dale, Jr. |
| 5,535,522 A | 7/1996 | Jackson |
| 5,724,128 A | 3/1998 | January |
| 5,724,743 A | 3/1998 | Jackson |
| 5,809,658 A | 9/1998 | Jackson et al. |
| 2003/0142294 A1 * | 7/2003 | Jackson et al. ........ 356/139.09 |

* cited by examiner

Primary Examiner—Yonel Beaulieu
(74) Attorney, Agent, or Firm—McDermott, Will & Emery

(57) ABSTRACT

A diagnostic method and system for determining an operational status of a multiple-link steering system for steering an object attached thereto. The system includes a position determination system for obtaining positional signals related to a steering system, and a data processing system to calculate positional parameters of the steering system based on the positional signals. The data processing system includes a data processor for processing data and a data storage device for storing data. The data storage device bears instructions upon execution by the data processor causing the data processing system to receive a first, second and third positional signal of the steering system when the object being steered to a first, second and third steering angle respectively. The data processing system calculates a first positional parameter for the steering system based on the first and second positional signals, and a second positional parameter for the steering system based on the second and third positional signals. An operational status of the steering system is determined based on the first and second positional parameters, and reference positional parameters.

48 Claims, 10 Drawing Sheets

US 6,728,609 B2

DIAGNOSTIC METHOD AND SYSTEM FOR A MULTIPLE-LINK STEERING SYSTEM

FIELD OF THE DISCLOSURE

The disclosure generally relates to a method and system for determining an operational status of a steering system, and more specifically, to a method and system for determining and evaluating the operation of steering axes in a multiple-link steering system.

BACKGROUND

Steering systems are common in machines or vehicles for rotating or steering mechanical parts. For example, virtually every vehicle uses a steering system to steer the wheels. One important characteristic of a steering system is the steering axis around which mechanical parts or wheels rotate or pivot. For motor vehicles, an alignment process is used to determine and adjust parameters of the steering axis and the steering system. The parameters include camber, caster, steering axis inclination (SAI) and toe.

A camber angle is the inclination of the wheel plane viewed from the front with respect to the vertical plane. A camber angle is defined positive when the wheel leans outward at the top, and negative when it leans inward. Caster is the angle of the steering axis, viewed from the side of the vehicle, relative to the tire's vertical centerline. A caster angle is considered positive when the top of steering axis is inclined rearward and negative when the top of the steering axis is inclined forward. Steering axis inclination (SAI) is the angle between the steering axis, when viewed from the front of the vehicle, relative to the vertical line of the vehicle.

In order to measure these parameters, an operator may use a vision imaging system such as a computer-aided, three-dimensional (3D) machine vision that employs optical sensing devices, such as cameras, to determine the positions of various objects. Examples of such apparatus and methods are disclosed in U.S. Pat. No. 5,724,743, entitled "Method and Apparatus for Determining the Alignment of Motor Vehicle Wheels," issued to Jackson, et al. on Mar. 10, 1998, and in U.S. Pat. No. 5,535,522, entitled "Method and Apparatus for Determining the Alignment of Motor Vehicle Wheels," issued to Jackson, et al. on Jul. 16, 1996, each incorporated herein by reference.

These methods and systems work properly for vehicles using conventional steering systems. In a conventional steering system, each of the front wheels is connected to a knuckle. The knuckle has two ball joints: an upper ball joint connects to an upper link and a lower ball joint connects to a lower link. A steering link is connected to the knuckle via a pivot joint. The upper and lower ball joints work as pivot points. A driver uses a steering wheel that connects to the steering link to steer, or control the pivot of, the knuckle, which in turn pivots the wheels. As a result, the wheel pivots about a fixed steering axis extending from the upper ball joint to the lower ball joint.

FIG. 1 shows a multiple-link steering system 10, a different type of steering system. In FIG. 1, a knuckle 12 is attached to the brake rotor 16 of front wheel. Knuckle 12 has three ball joints: an upper ball joint 22 and two lower ball joints 26 and 28. An upper link 27 connects to knuckle 12 via upper ball joint 22 and to the chassis via two pivot hinges, forming a rigid triangle. A front lower link 32 connects to knuckle 12 via lower ball joint 28 and to the chassis via ball joint F. A rear lower link 34 connects to knuckle 12 via lower ball joint 26 and to the chassis via ball joint R. A steering link 14 is connected to knuckle 12 via another ball joint 24. Similar to the conventional steering system, a driver uses a steering wheel that connects to steering link 14 to steer, or control the pivot of, knuckle 12, which in turn pivots the wheel.

The chassis connections, and the interconnections of the linkage elements just described, constrain the motions of those elements relative to each other and the chassis. In particular, since the wheel is rigidly attached to knuckle 12, which is attached to links 32 and 34 at joints 26, 28, and links 32 and 34 are attached to the chassis at joints F and R, joints 26, 28 are constrained to move along arcs defined by this linkage. Due to this linkage, the position of joint 26 determines the position of 28, and vice versa. These positions determine the position and orientation of knuckle 12, and the wheel attached thereto, relative to the chassis. As steering link 14 moves from one position to another, joints 26, 28 also move.

Lower links 32, 32 may be parallel to each other in space. Thus, the extension lines FL, RL of lower links 32, 34 do not necessarily intersect with each other. A pivot point may be defined as the midpoint of the two closest points on extension lines FL, RL of lower links 32, 34. Other definitions of pivot points may also be used. FIGS. 1 and 2 show an example when the extension lines of lower links 32, 34 intersect with each other. In this case, since the distance between the two lines is zero, the midpoint (the pivot point) is thus the same as the intersection point. In FIG. 1, a steering axis Xref about which the wheel pivots is defined as an axis passing through upper pivot point 22 and lower pivot point, which is the intersection 25 of lower links 32, 34.

Due to the movable linkage structure, the multiple link steering system does not have a fixed steering axis as that in conventional non-multiple-link steering systems. Rather, the multiple link steering system has a variable steering axis as the wheel turns. The change in the steering axis can be seen from FIGS. 1 and 2.

In FIGS. 1 and 2, the wheel is steered to a first direction and a second direction respectively. In FIG. 2, the steering axis of FIG. 1 is marked as Xref, and the positions of two lower links of FIG. 1 are marked as FL and RL respectively. Due to the structure of the movable linkages, when the wheel is steered from the first direction to the second direction, front lower link 32 moves from FL to line F'L', and rear lower link 34 moves from line RL to line R'L'. As a result, the intersection of the two lower links shifts from point 25 to point 35. The steering axis hence shifts from Xref to X2, which extends from ball joint 22 to point 35, when the wheel is steered to the second direction. Accordingly, the steering axis of a multiple link steering system moves as the wheels are steered.

Other types of multiple-link steering systems are also available and have similar characteristics as illustrated in FIGS. 1 and 2. One type of multiple-link steering system has two upper links and only one lower link. Another type of multiple-link steering system has two links attached to both the upper and lower parts of the knuckle. The steering axes in these multiple-link steering systems also move as wheels are steered.

As steering axes in multiple-link steering systems move as wheels are steered, conventional methods for measuring parameters for a steering axis in non-multiple-link steering systems are not suitable for determining or evaluating steering axes in multiple link steering systems. Efforts have been devoted in establishing mathematical models for calculating the positional parameters of steering axes in a multiple-link steering system. However, such mathematical models are often complicated, and require a considerable amount of data and complex calculations. There is a need for a method and system that can easily evaluate the operation status of a multiple-link steering system, and without the need to know the exact positional parameters of the steering system. There is also a need to identify the existence of a multiple link steering system

SUMMARY

Diagnostic methods and systems are described to determine the existence and operational status of a multiple-link steering system for steering an object attached thereto. An exemplary diagnostic system includes a position determination system and a data processing system. The data processing system is coupled to the position determination system and configured to receive and process signals sent from the position determination system.

The position determination system is configured to obtain positional signals related to the steering system. In one example, the position determination system includes an optical sensing device, such as a camera, to form a viewing path with targets attached to the object. The optical sensing device generates positional signals of the targets based on the images or signals sensed by the device. In another example, the position determination system uses non-contact methods to obtain positional signals of the steering system. For example, an optical sensing device is used to view a wheel and generates signals of the wheel positions based on the images or signals sensed by the device.

The data processing system has a data processor for processing data and a data storage device for storing data. The data storage device bears instructions upon execution by the data processor causing the data processing system to perform a diagnostic process. In one embodiment, the data processing system receives a first, second and third positional signal of the steering system when the object is being steered to a first, second and third steering angle respectively. The data processing system calculates a first positional parameter for the steering system based on the first and second positional signals, and a second positional parameter for the steering system based on the second and third positional signals. An operational status of the steering system is determined based on the first and second positional parameters, and reference positional parameters.

In another embodiment, the diagnostic system is used to determine the operational status of a steering system in a vehicle having multiple-link suspension. The data processing system calculates multiple positional parameters, such as caster values, of the steering system based on the positional signals. The data processing system has access to data related to specifications of the steering system under test. The operational status of the steering system may be determined by comparing the positional parameters and the specifications of the steering system.

In one aspect, the calculated positional parameters are evaluated to determine if the parameters are substantially the same throughout various portions of the turning and measurement process. If the values are substantially constant, it is determined that the steering system is a non-multiple-link steering system. Position determination methods corresponding to non-multiple-link steering systems will be used.

If, however, the parameters vary at different steering angles, then it is determined that the steering system is a multiple-link steering system and corresponding position determination methods can be used. For instance, in a vehicle, the method may include measurements of steering the wheel in multiple small segments of turning.

The measurement of various steering segments may be made in both steering directions. For example, from left to the right and from right to the left, or vice versa. A plot of the measurements may show hysteresis of the steering, and thus reveal further deficiencies, such as worn components, in the vehicle being measured and diagnosed. Alternatively, the process may include only one measurement at or near the straight ahead toe position, to determine the caster, SAI, and steering axis position corresponding to the straight ahead position. For example, measurements may be taken when the wheel is steered from −4 degrees to 4 degrees.

In another embodiment, the data processing system designates the first positional parameter as the caster value corresponding to the first steering angle and the second positional parameter as the caster value corresponding to the second steering angle. In another embodiment, the data processing system designates the first positional parameter as the caster value corresponding to a steering angle between the first and second steering angle, and the second positional parameter as the caster value corresponding to a steering angle between the second and third steering angle. In still another embodiment, the first positional parameter is designated as the caster for an angle substantially equal to either the first steering angle or the second steering angle, and the second positional parameter is designated as the caster for an angle substantially equal to either the second steering angle or the third steering angle.

In still another embodiment, the diagnostic system is used to determine the operational status of a steering system of a vehicle having multiple-link suspension. The diagnostic process used by the diagnostic system measures multiple caster values of the vehicle at different steering angles in small increments. For example, caster measurement is taken every 5 degrees, spanning a +/−20° range relative to the thrust line of the vehicle.

Still other advantages of the diagnostic system and method will become readily apparent from the following detailed description, simply by way of illustration and not limitation. As will be realized, the method and system are capable of other and different embodiments, and its several details are capable of modifications in various obvious respects, all without departing from the disclosure. Accordingly, the drawing and description are to be regarded as illustrative in nature, and not as restrictive.

BRIEF DESCRIPTION OF THE DRAWINGS

The present disclosure is illustrated by way of example, and not by way of limitation, in the figures of the accompanying drawings and in which like reference numerals refer to similar elements and in which.

DETAILED DESCRIPTION OF ILLUSTRATIVE EMBODIMENTS

Figure 1:
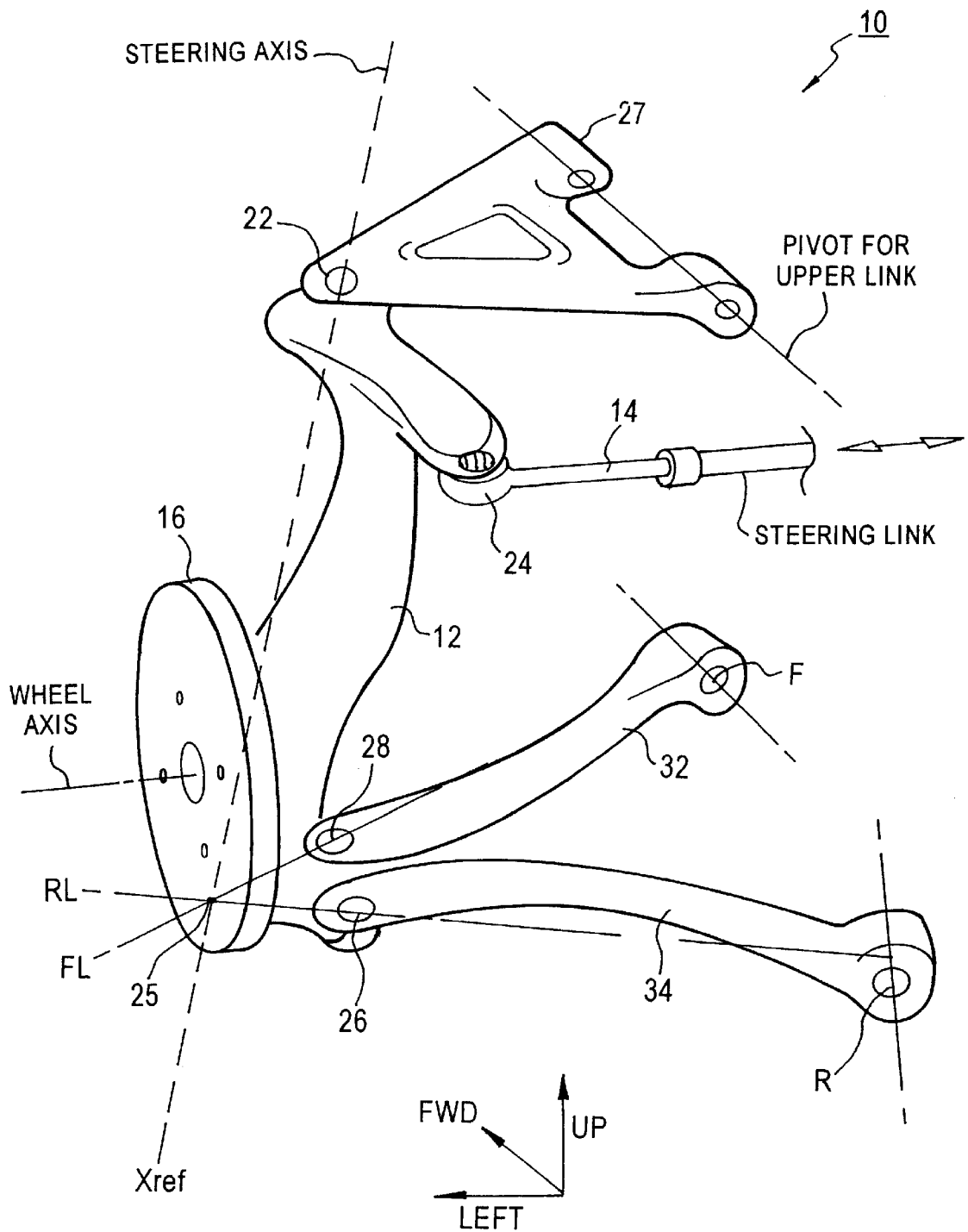
FIGS. 1 and 2 illustrate the operation of a steering system in a vehicle using multiple-link suspension.
Figure 2:
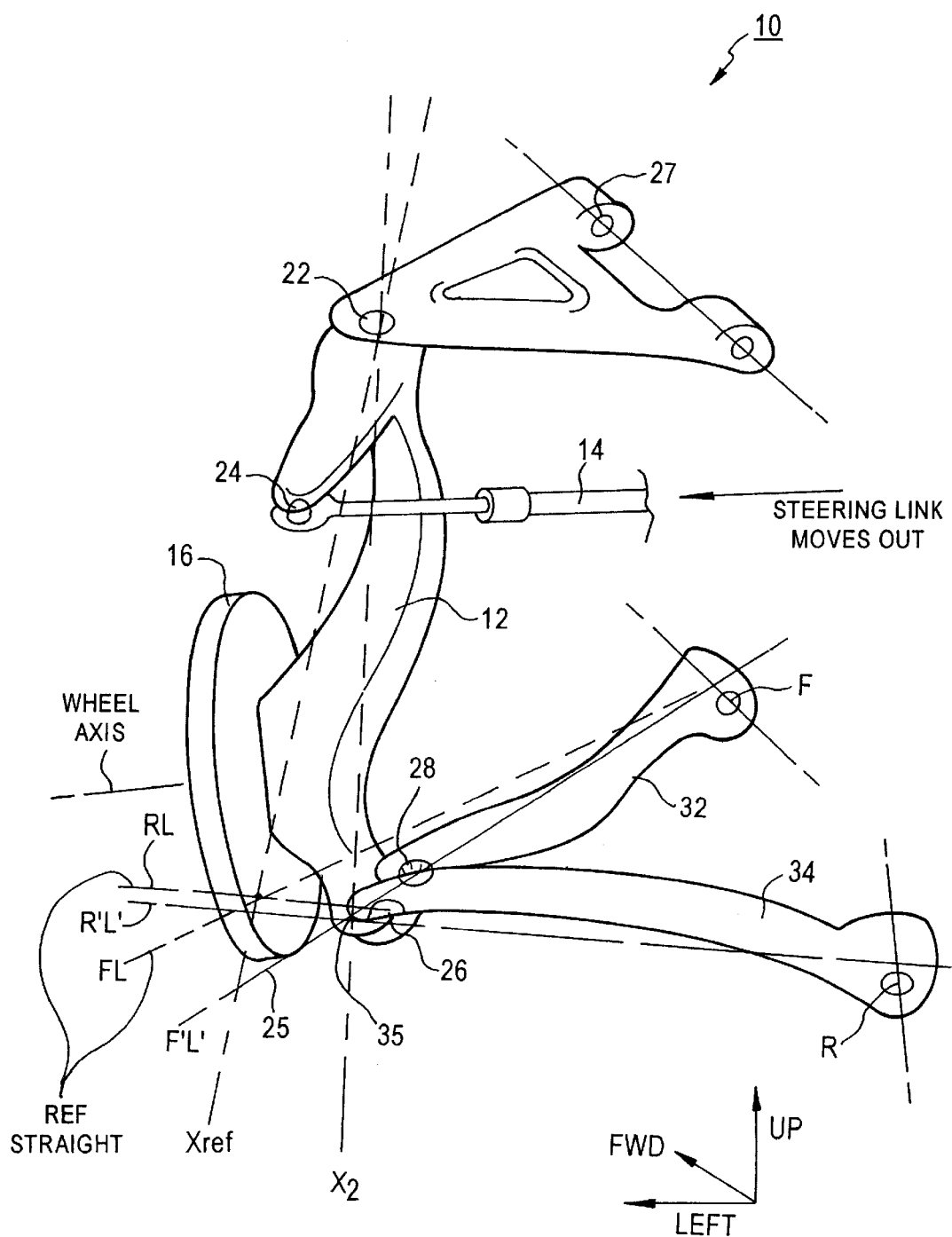

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

System Overview

For illustration purpose, the following example describes the operation of an exemplary diagnostic system when used to evaluate a steering system of a vehicle having a multiple-link suspension. The diagnostic system includes a data processing system and a position determination system. The position determination system is capable of obtaining positional information about a vehicle, such as ride height, toe curve, tilt angle, camber, caster, SAI and the angular relationship of the vehicle's body relative to the vehicle's wheels.

An SAE publication NO. 850219, titled "Steering Geometry and Caster Measurement," by January, discusses the procedures and methods by which caster angle can be derived from toe and camber measurements. According to the paper, the relation between the positional parameters is as follows:

$$\sin C = (\cos C0 \cdot \cos C \cos T) \tan S \cdot \cos C \sin T \tan k + \sin C0 \quad (1)$$

where

C=camber

C0=camber at zero toe

K=caster

S=SAI

T=toe (relative to the thrust line)

Examples of position determination systems are disclosed in U.S. Pat. No. 5,724,743, entitled "Method and Apparatus for Determining the Alignment of Motor Vehicle Wheels," issued to Jackson, et al. on Mar. 10, 1998 and in U.S. Pat. No. 5,535,522, entitled "Method and Apparatus for Determining the Alignment of Motor Vehicle Wheels," issued to Jackson, et al. on Jul. 16, 1996, as previously stated, both of which are incorporated herein by reference.

Other types of position determination systems that are well known to persons skilled in the art may also be used to implement the diagnostic system. Examples of such position determination system include using a gravity-referenced inclinometer or alignment head, which is mounted to a vehicle wheel for measuring the alignment parameters. Descriptions of such position determination systems can be found in U.S. Pat. No. 4,761,749, entitled "Vehicle Wheel Alignment Apparatus and Method," issued to Titsworth, et al. on Aug. 2, 1988; U.S. Pat. No. 5,519,488, entitled "Eight Sensor Wheel Aligner," issued to Dale, Jr., et al. on May 21, 1996; and U.S. Pat. No. 5,531,030, entitled "Self-calibrating Wheel Alignment Apparatus and Method," issued to Dale, Jr., et al. on Jul. 2, 1996, all of which are incorporated herein by reference.

Another type of position determination system that can be used to obtain positional signals of the steering system is a non-contact position determination system, in which no target, head or even stick is attached to the object linked to the steering system during the measurement process. Examples of non-contact position determination system are described in U.S. Pat. No. 4,745,469, entitled "Vehicle Wheel Alignment Apparatus and Method," issued to Waldeker, et al. on May 17, 1988, and U.S. Pat. No. 4,899,218, entitled "Vehicle Wheel Alignment Apparatus and Method," issued to Waldeker, et al. on Feb. 6, 1990, both of which are incorporated herein by reference.

Figure 3:
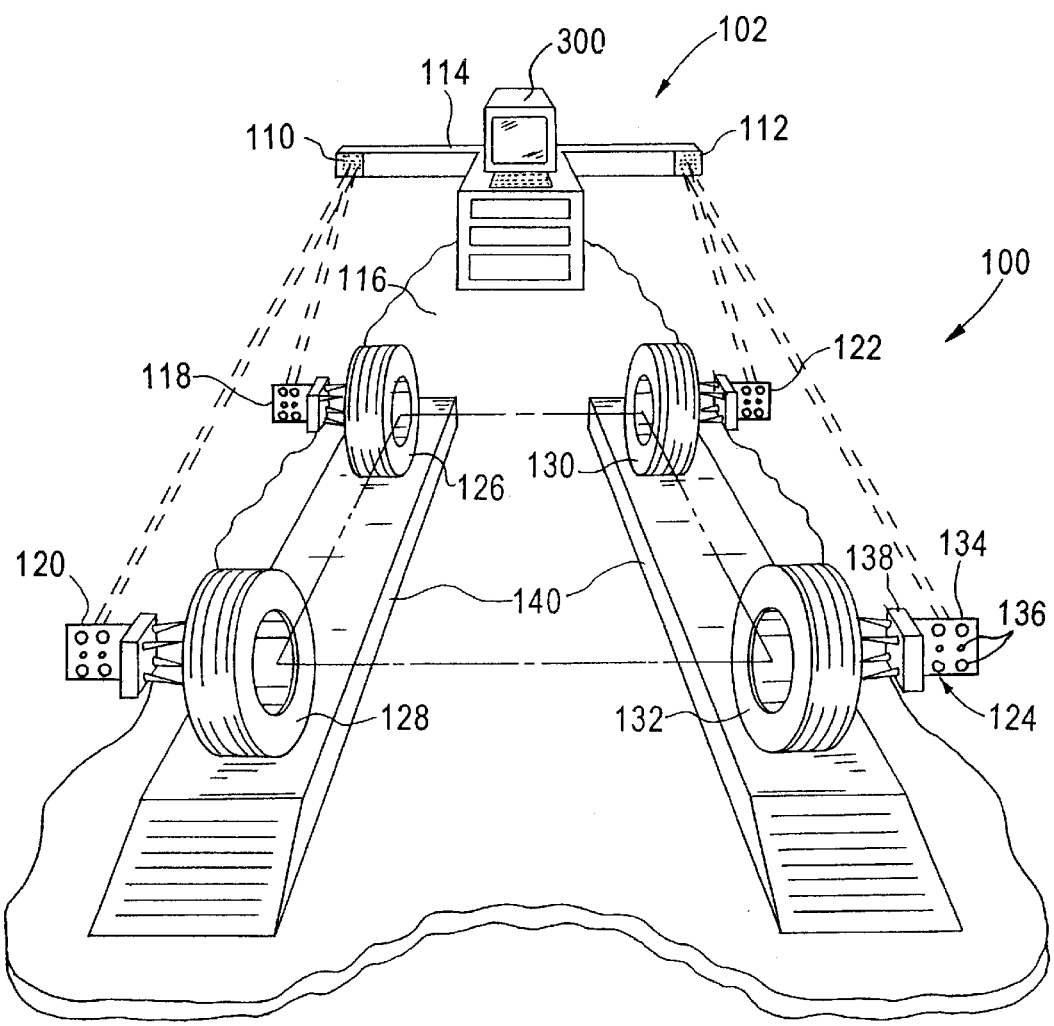
FIG. 3 is a position determination system upon which an exemplary diagnostic system may be implemented.

FIG. 3 shows a position determination system upon which an exemplary diagnostic system may be implemented. The position determination system 100 includes a vision imaging system 102 having a pair of fixed, spaced-apart cameras 110, 112 mounted on a beam 114. The beam 114 has a length sufficient to position the cameras 110, 112 respectively outboard of the sides of the vehicle to be imaged by the position determination system 100. Also, the beam 114 positions the cameras 110, 112 high enough above the shop floor 116 to ensure that the two targets 118, 120 on the left side of the vehicle are both within the field of view of the left side camera 110, and two targets 122, 124 on the right side of the vehicle are both within the field of view of the right side camera 112.

A vehicle under test is driven onto a lift 140. Targets 118, 120, 122, 124 are mounted on each of the wheels 126, 128, 130, 132 of the motor vehicle, with each target 118, 120, 120, 124 including a target body 134, target elements 136, and an attachment apparatus 138. The attachment apparatus 138 attaches the target 118, 120, 120, 124 to wheel 126, 128, 130, 132. An example of an attachment apparatus is described in U.S. Pat. No. 5,024,001, entitled "Wheel Alignment Rim Clamp Claw" issued to Borner et al. on Jun. 18, 1991, incorporated herein by reference. The target elements 136 are positioned on the target body 134.

In operation, once the position determination system 100 has been calibrated using a calibration target (not shown), as described in the incorporated references, a vehicle can be driven onto the rack 133, and, if desired, the vehicle lifted to an appropriate repair elevation. The targets 118, 120, 122, 124, once attached to the wheel rims, are then oriented so that the target elements 136 on the target body 134 face the respective camera 110, 112. The vehicle and model year can then entered into the vision imaging system 102 along with other identifying parameters, such as vehicle VIN number, license number, owner name, etc.

The location of the targets 118, 120, 122, 124 relative to the rim of the wheels 126, 128, 130, 132 to which the targets are attached are typically known to an accuracy of about 0.01" and about 0.01°. Once the targets 118, 120, 122, 124 have been imaged in one position, the wheels 126, 128, 130, 132 are rolled to another position and a new image can be taken. Using the imaged location of the targets 118, 120, 122, 124 in the two positions, the actual position and orientation of the wheels 126, 128, 130, 132 and wheel axis can be calculated by the vision imaging system 102. Although the distance between the two positions varies, the distance is often approximately 8 inches.

A data processing system 300, such as a personal computer, is coupled to cameras 110, 112 to receive target positional signals obtained thereby. In practice, a mathematical representation, or data corresponding to a true image (i.e. an image taken by viewing the target device perpendicularly to its primary plane) and the dimensions of targets 54 are preprogrammed into the memory of the data processing system 300 so that, during the alignment process, the data processing system 300 has a reference image to which the viewed perspective images of the target devices can be compared.

Figure 4:
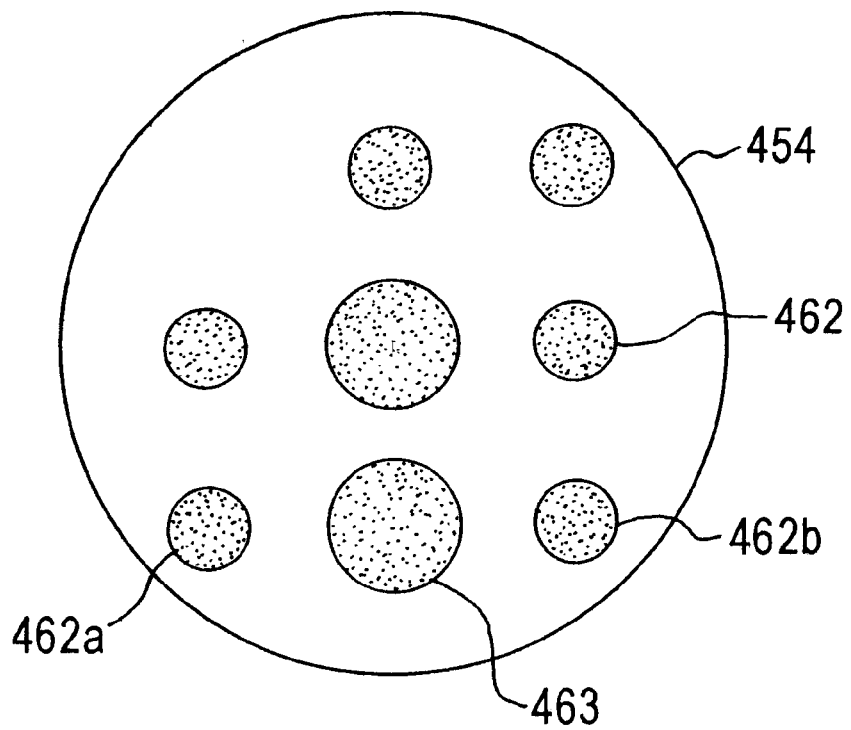
FIG. 4 is an exemplary target that can be used with the position determination system illustrated in FIG. 3.

FIG. 4 shows an exemplary target that can be used in the position determination system. Data processing system 300 calculates the orientation of the targets 110, 112 by identifying certain geometric characteristics on the targets. For example, data processing system 300 may calculate the center of each of the circles 462a, 462b on target 454 by means of centroiding. This is a method commonly used by image analysis computers to determine the positioning of the center point or centerline of an object. Once the center points of the two circles 462a, 462b have been determined, the distance between the two can be measured. This process is then repeated for other circles in the pattern on the targets 454. These distances can then be compared to the true distances (i.e. non-perspective distances) between the respective centers. Similarly, the angle to the horizontal (or vertical) of the line joining the two centers can be determined. A calculation can then be made as to the orientations of the targets 454. Data processing system 300 takes perspective measurements and compares these measurements with the true image previously pre-programmed into the memory of data processing system 300.

Hardware Overview of the Data Processing System

As discussed above, the diagnostic system includes a data processing system 300, to conduct numerous tasks, such as processing positional signals, calculating relative positions, providing a user interface to the operator, displaying alignment instructions and results, receiving commands from the operator, sending control signals to rotate the alignment cameras, etc.

Figure 5:
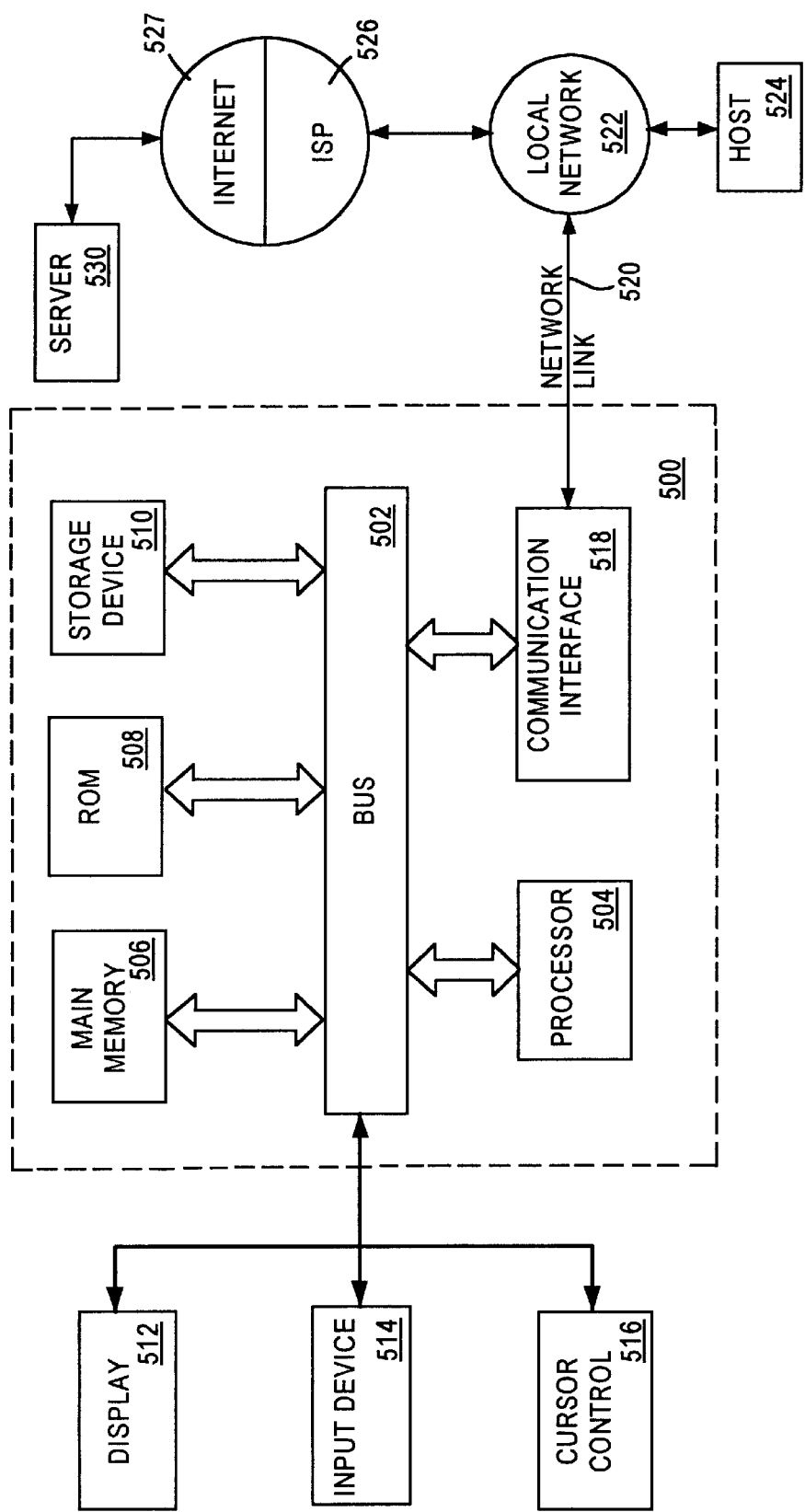
FIG. 5 depicts a data processing system upon which an exemplary diagnostic system may be implemented.

FIG. 5 is a block diagram that illustrates an exemplary data processing system 300 upon which an embodiment of the disclosure may be implemented. Data processing system 300 includes a bus 502 or other communication mechanism for communicating information, and a processor 504 coupled with bus 502 for processing information. Data processing system 300 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Data processing system 300 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Data processing system 300 may be coupled via bus 502 to a display 512, such as a cathode ray tube (CRT), for displaying information to an operator. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512.

The data processing system 300 is controlled in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the disclosure. Thus, embodiments of the disclosure are not limited to any specific combination of hardware circuitry and software.

The term "machine readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a data processing system can read.

Various forms of machine-readable media may be involved in carrying one or more sequences of one or more instructions to processor 504 for execution. For example, the instructions may initially be carried on a magnetic disk of a remote data processing. The remote data processing system can load the instructions into its dynamic memory and send the instructions over a telephone line using a modem. A modem local to data processing system 300 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Data processing system 300 also includes a communication interface 518 coupled to bus 502. Communication interface 518 provides a two-way data communication coupling to a network link 520 that is connected to a local network 522. For example, communication interface 518 may he an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host data processing system 524 or to data equipment operated by an Internet Service Provider (ISP) 526. ISP 526 in turn provides data communication services through the world large packet data communication network now commonly referred to as the "Internet" 527. Local network 522 and Internet 527 both use electrical, electromagnetic or optical signals that carry digital data streams. The signals through the various networks and the signals on network link 520 and through communication interface 518, which carry the digital data to and from data processing system 300, are exemplary forms of carrier waves transporting the information.

Data processing system 300 can send messages and receive data, including program code, through the network (s), network link 520 and communication interface 518. In the Internet example, a server 530 might transmit a requested code for an application program through Internet 527, ISP 526, local network 522 and communication interface 512. In accordance with embodiments of the disclosure, one such downloaded application provides for automatic calibration of an aligner as described herein.

The data processing also has various signal input/output ports (not shown in the drawing) for connecting to and communicating with peripheral devices, such as USB port, PS/2 port, serial port, parallel port, IEEE-1324 port, infra red communication port, etc., or other proprietary ports. The measurement modules may communicate with the data processing system via such signal input/output ports.

Diagnoses Process

An exemplary diagnostic process used by the diagnostic system to determine the caster status of a vehicle is described as follows. During the diagnostic process, the vehicle under test is driven onto lift 140 such that the vehicle in as central a position as possible between two cameras 110, 112. The targets, especially the targets attached to the steerable wheels, are mounted in a manner that would minimise the effects of targets being viewed at a steep angle to the cameras.

The diagnostic process used by the diagnostic system measures multiple caster values of the vehicle at different steering angles in small increments. For example, caster measurement data is taken every 5 degrees, spanning a +/−20° range relative to the thrust line of the vehicle. Other increments in steering angles may also be used. In addition, the increments between steering angles do not have to be the same or constant. For instance, the increment between the first and second steering angles may be 3 degrees, and the increment between the third and fourth steering angle may be 8 degrees.

By steering the wheels in small increments, the movement and translation of the links are limited. The characteristics of the steering axes in a vehicle having a multiple-link suspension are thus very similar to those of a non-multiple-link suspension system. In other words, within each small increment of steering angles, the steering axes of a vehicle having a multiple-link suspension system can be treated and measured in a way similar to the steering axis of a vehicle having non-multiple-suspension system.

Figure 6:
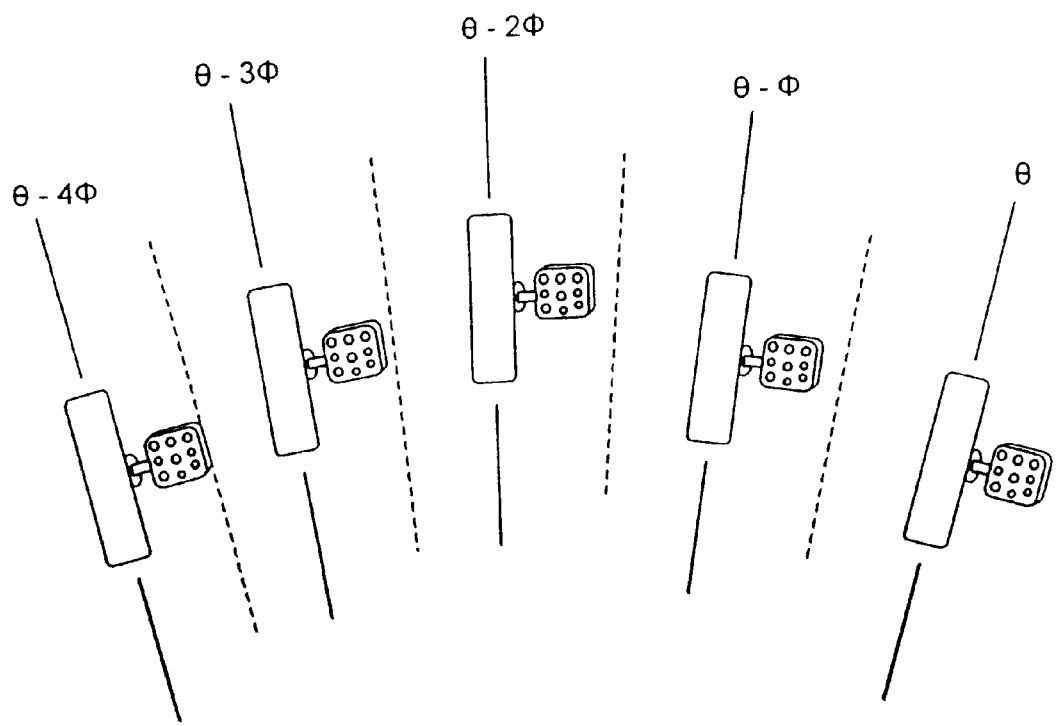
FIG. 6 shows different steering angles to which a wheel is positioned during an exemplary diagnostic process.

Caster values of a vehicle can be measured by using any alignment system. Examples of such alignment system include U.S. Pat. No. 5,724,743, entitled "Method and Apparatus for Determining the Alignment of Motor Vehicle Wheels," issued to Jackson, et al. on Mar. 10, 1998 and in U.S. Pat. No. 5,535,522, entitled "Method and Apparatus for Determining the Alignment of Motor Vehicle Wheels," issued to Jackson, et al. on Jul. 16, 1996, both of which are mentioned previously and incorporated herein by reference previously. Optionally, caster values may be measured by a position determination system using mathematical models to calculate accurate caster values for the vehicle under test. The caster measurement process is as follows:

1. Steer the steerable wheels to a first steering angle, such as θ−4Φ as illustrated in FIG. 6. The position determination system acquires an image of the targets in this position. Data processing system 300 then determines the orientation and co-ordinates of the targets in its co-ordinate system.

2. Turn the wheels to a second steering angle, such as θ−3Φ as illustrated in FIG. 6, and hold the steerable wheels in this position while an image is again acquired by the cameras. Data processing system 300 system then determines the orientation and co-ordinates for the targets in this position.

3. Data processing system 300 uses algorithm corresponding to the position determination system to determine the axis of rotation about which the targets in the first position would have needed to rotate in order to arrive at the second steering angle. This axis of rotation is designated as an approximation of the instantaneous steering axis for a steering angle between the first steering angle and the second steering angle, such as θ−3.5Φ.

4. The wheels are again turned in the same direction to a third steering angle, such as θ−2Φ as illustrated in FIG. 6. The position determination system acquires an image of the targets in this position. Data processing system 300 determines their orientation and co-ordinates in its co-ordinate system.

5. Similar to step 3, data processing system 300 calculates an instantaneous steering axis corresponding to the second steering angle based on the positional information of the targets in the second steering angle and the third steering angle. The instantaneous axis corresponds to the axis of rotation about which the targets would have to rotate to bring them into the present position. Data processing system designates the steering axis to be corresponding to a steering angle between the second and third steering angle, such as θ−2.5Φ.

6. The process continues the step described in steps 4 and 5 for successive steering positions until the wheels have been steered to a specified angle, such as passing the straight-ahead position. In each case, the steering axis is a unit vector whose orientation is described in a specified co-ordinate system. Approximates of instantaneous steering angles corresponding to θ−1.5Φ and θ−0.5Φ are designated.

7. At the end of the turning process, data processing system 300 uses caster algorithm to calculate caster values based on instantaneous steering axes corresponding to steering angles θ−3.5Φ, θ−2.5Φ, θ−1.5Φ, and θ−0.5Φ. In one embodiment, data processing system 300 determines the projection of an instantaneous axis onto the vertical plane to determine the caster angle corresponding to this steering axis.

While the above process describes calculating caster values after steering axis for every steering angles is obtained, alternatively, the caster values can be determined at any time as long as sufficient information is available without waiting until all the steering axes are determined. In addition, the number of positions to which the wheel is steered is for illustration purpose only. Other number of positions can be also used in a similar process. Furthermore, the turning of the wheel can be also conducted in a discrete manner. For example, measurements can be taken when the wheel is steered from −20 degrees to −5 degrees and from 3 degrees to 8 degrees respectively. These measurements are then used to determine caster values of the steering system.

Figure 7:
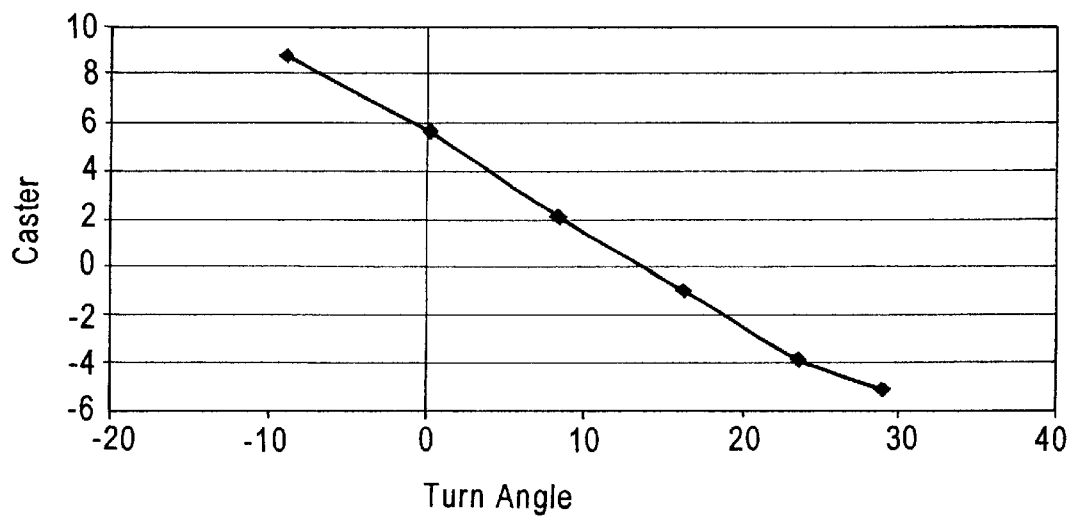
FIG. 7 is an example of caster values obtained by conducting an exemplary diagnostic process.

The caster values corresponding to various steering angles may be plotted and shown on display 512 of data processing system 300. FIG. 7 shows an example of a cater value curve. The vertical axis is caster value and the horizontal curve is the steering angles. In one embodiment, after the caster measurement process is conducted as described above, the same measurement process may be conducted again in a reverse turning direction. For example, if the caster measurements were obtained during the wheels are turned from the left to right, the second set of caster measurements may be obtained by turning the wheels from the right to the left.

Figure 8:
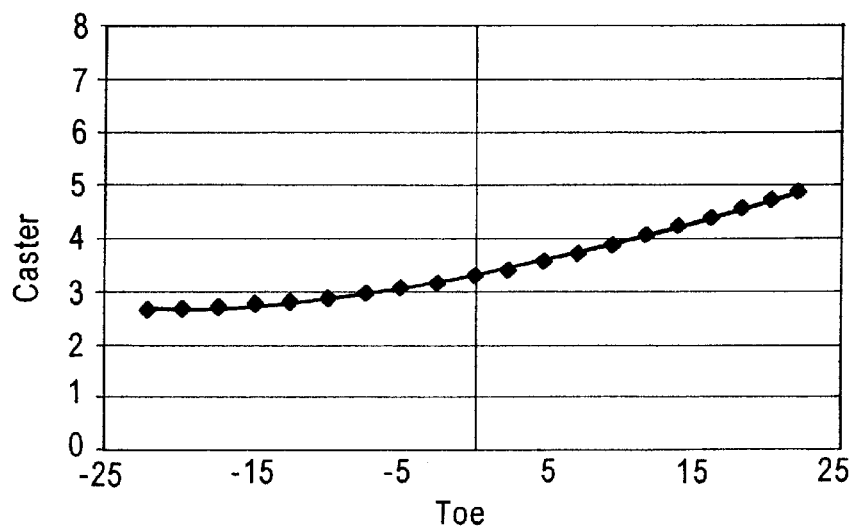
FIG. 8 is an example of caster value specifications of a vehicle under test.

Data processing system 300 can access a database related to specifications of the vehicle under test. The information may be stored in data storage device 510 or in a remote data processing system that is accessible by data processing system 300 via a data transmission network connected therebetween. Such specifications may be provided by vehicle manufacturers or obtained empirically. FIG. 8 shows an example of caster specification information of a vehicle under test. The vertical axis is the caster value and the horizontal axis is the steering angles. Each dot represents the caster value corresponding to each steering angle required by the specification of the vehicle under test. A polynomial linking the dots is derived based on the values of the dots.

Figure 9A:
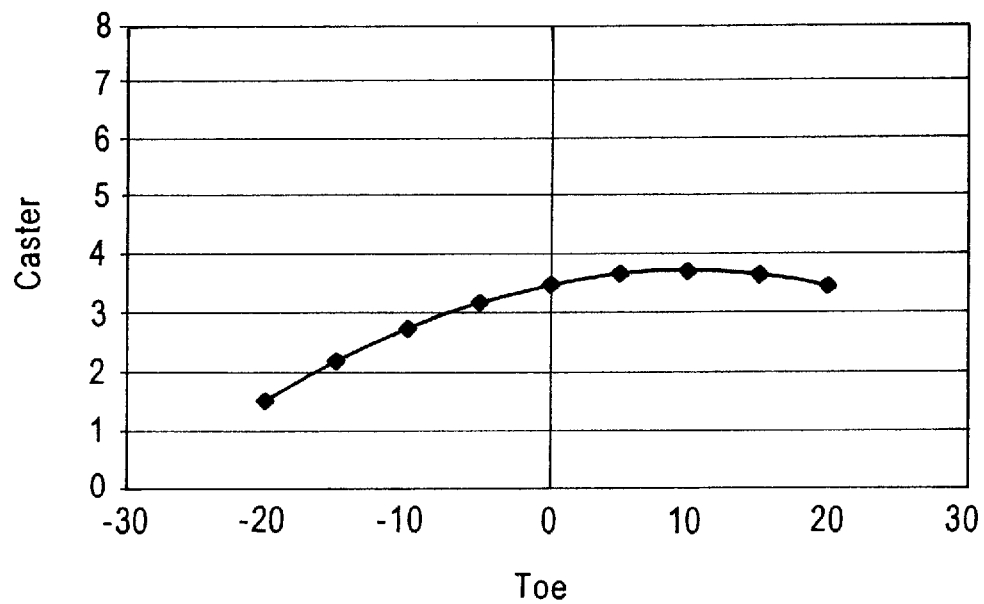
FIGS. 9a–9d are examples of caster values of a vehicle obtained by using the exemplary diagnostic process.
Figure 9B:
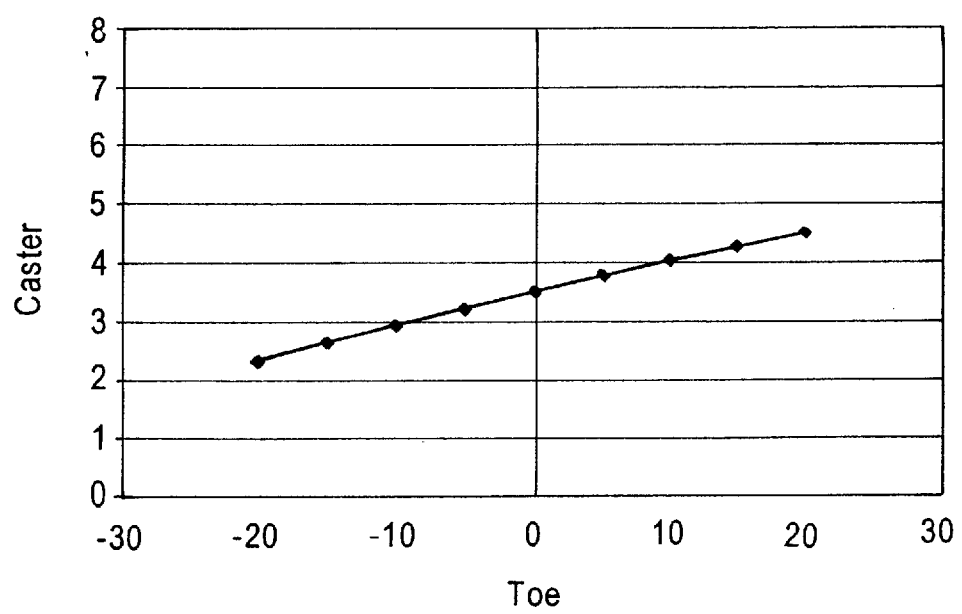
Figure 9C:
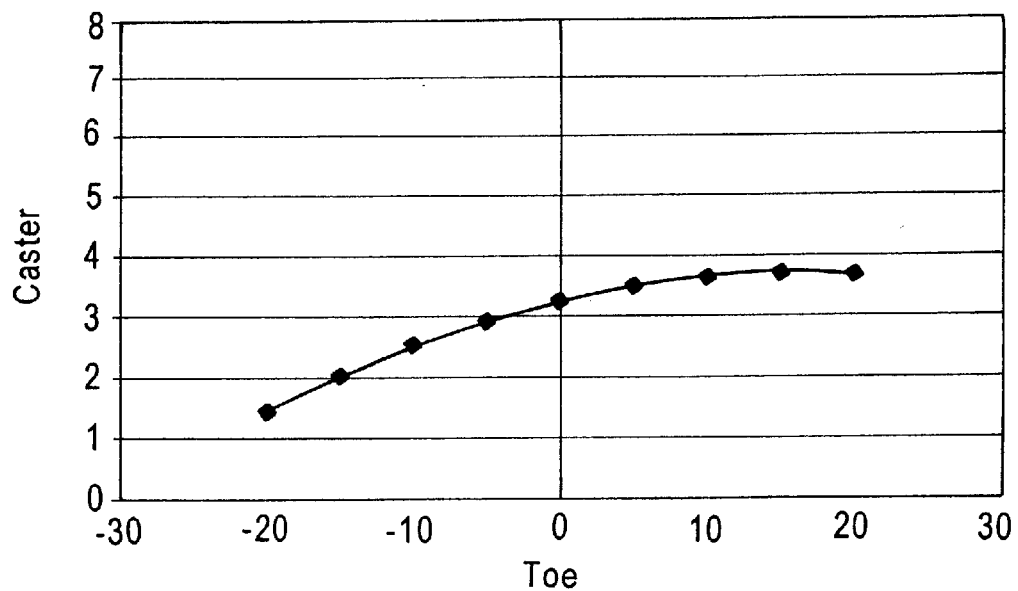
Figure 9D:
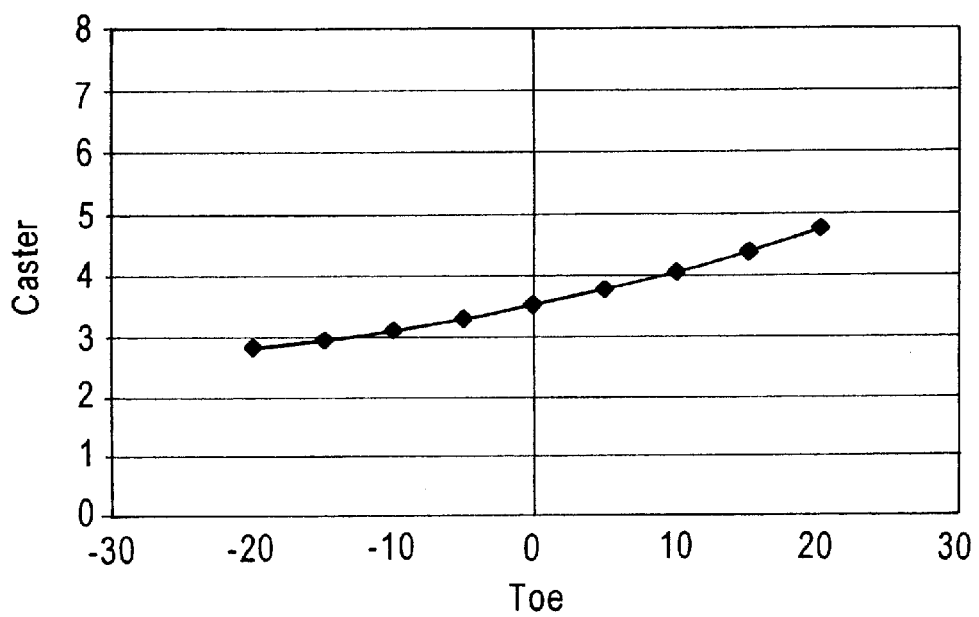

FIGS. 9a–9d show caster angle measurements of a vehicle having the same model as that of FIG. 8. The measurements are obtained using the diagnostic system and process as described above. FIG. 9a shows caster values of the left wheel when the wheel is steered from left to right relative to the thrust line of the vehicle. FIG. 9b depicts the caster values of the right wheel when the wheel is turned from left to right relative to the thrust line of the vehicle. FIGS. 9c and 9d illustrate caster values of the left and right wheel respectively when the wheels are turned from the right to left. Optionally, polynomials linking the data dots can be derived based on the values of the measurements. The polynomials are used to assist diagnoses of the steering system.

Figure 10:
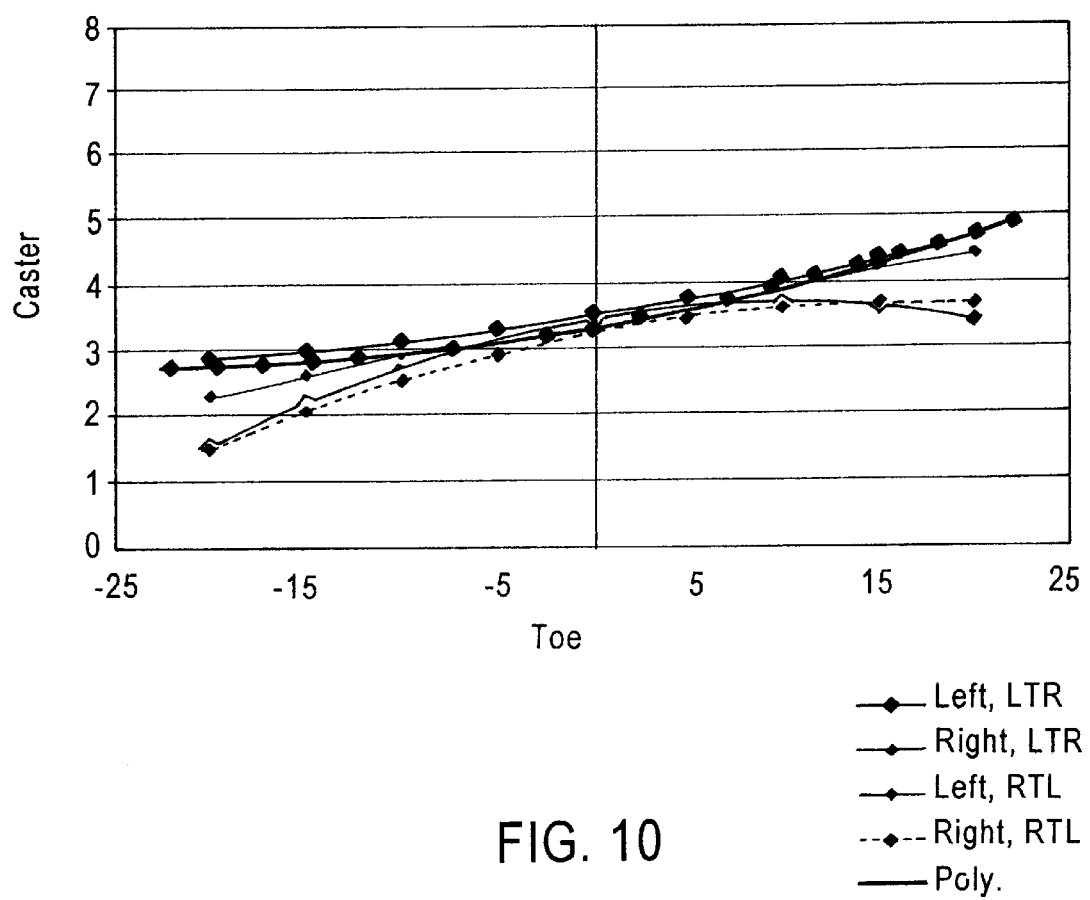
FIG. 10 is an overlay of specification caster values and measurements obtained by the exemplary diagnostic process.

FIG. 10 shows a comparison of the measurement results of FIGS. 9a–9d overlaid with the specification caster values as depicted in FIG. 8. The operational status of the steering system can be evaluated by visual inspection of the overlay or by using a diagnostic algorithm. The diagnostic algorithm can be derived empirically for different vehicle models. For example, an acceptable tolerance range, such as 10%, can be set for a specific positional parameter at each steering angle. If any of the differences between the measurements and the specification values exceeds the tolerance range, data processing system 300 may generate a warning message. Otherwise, data processing system 300 will indicate that the steering system of the vehicle is normal.

Other algorithm or tolerance ranges can be used depending on design requirements and preference. For example, the diagnostic process as described above can be conducted several times on the same vehicle. The data processing system determines an operational status of the steering system based on the differences between the specification caster value and the average of the measurements.

Another embodiment of the diagnostic process may include a preliminary evaluation to determine the type of steering system used in the vehicle under test. If the vehicle is determined to have a non-multiple-link steering system, determination of positional parameters will be conducted in a conventional way. If, however, it is determined that the vehicle under test uses a multiple-link steering system, a process as described above will be used to determine the positional parameters.

The preliminary evaluation includes steps similar to those described above. For example, the preliminary evaluation may include steps 1–7. The obtained positional signals may be used to calculate parameters related to steering axes, such as caster and/or SAI. Parameters corresponding to various steering angles are compared. If the values are substantially constant, it is determined that the steering system is a non-multiple-link steering system. Position determination methods corresponding to non-multiple-link steering systems will be used.

On the other hand, if, however, the parameters corresponding to different steering angles vary, it is determined that the steering axis changes as the wheel is turned. It is determined that the steering system is a multiple-link steering system and corresponding position determination methods can be used. For instance, in a vehicle, the method may include measurements of steering the wheel in multiple small segments of turning. The method may include making measurements by steering the wheel through small steering increments, or a single measurement sector about zero toe, at a small turning angle from one side to zero toe to the other side of zero toe. In the case of using a signal measurement about zero toe, the arc may be from 2 to 8 degrees.

The above diagnostic process describes using data processing system 300 to calculate a caster value based on positional signals of the targets when the wheel is positioned at a first steering angle and a second steering angle. The caster value is then designated as the caster value corresponding to a steering angle between the first steering angle and the second steering angle. Nevertheless, the diagnostic system can use a different designation methodology for positional parameters. For example, the diagnostic system can designate the same caster value as the caster value of the first or second steering angle. Alternatively, the diagnostic system can designated the same caster value as the caster value for any angle between the first and second steering angles.

The disclosure has been described with reference to specific embodiments thereof. It will, however, be evident that various modifications and changes may be made thereto without departing from the broader spirit and scope of the disclosure. The specification and drawings are, accordingly, to be regarded in an illustrative rather than a restrictive sense.

What is claimed is:

1. A system for diagnosing a steering system that steers an object, comprising:

an optical sensing device for forming a viewing path with a target attached to the object and for generating positional signals of the target; and a data processing system configured to couple to the optical sensing device, the data processing system including a data processor for processing data and a data storage device for storing data, wherein the data storage device bears instructions upon execution by the data processor causing the data processing system to perform the steps of:

receiving a first positional signal of the target with the object positioned at a first steering angle;

receiving a second positional signal of the target with the object positioned at a second steering angle;

receiving a third positional signal of the target with the object positioned at a third steering angle;

calculating a first positional parameter for the steering system based on the first and second positional signals;

calculating a second positional parameter for the steering system based on the second and third positional signals;
accessing reference positional parameters; and
determining an operational status of the steering system based on the first and second positional parameters, and the reference positional parameters.

2. The system of claim 1, wherein the steering system is a steering system of a vehicle having a multiple link suspension.

3. The system of claim 2, wherein the first and second positional parameters are caster values of the vehicle.

4. The system of claim 1, wherein both the difference between the first and second steering angles, and the difference between the second and third steering angles are smaller than a predetermined angle.

5. The system of claim 4, wherein the predetermined angle is five degrees.

6. A machine-readable medium bearing instructions for controlling the operation of a data processing system for determining an operational status of a steering system that steers an object, the instructions upon execution by the data processing system causing the data processing system to perform the steps of:
receiving a first positional signal of a target attached to the object with the object positioned at a first steering angle;
receiving a second positional signal of the target with the object positioned at a second steering angle;
receiving a third positional signal of the target with the object positioned at a third steering angle;
calculating a first positional parameter for the steering system based on the first and second positional signals;
calculating a second positional parameter for the steering system based on the second and third positional signals;
accessing reference positional parameters stored in the data storage device or from a remote data storage device; and
determining an operational status of the steering system based on the first and second positional parameters, and the reference positional parameters.

7. The machine-readable medium of claim 6, wherein the steering system is a steering system of a vehicle having a multiple link suspension.

8. The machine-readable medium of claim 7, wherein the first and second positional parameters are caster values of the vehicle.

9. The machine-readable medium of claim 8, wherein both the difference between the first and second steering angles, and the difference between the second and third steering angles are smaller than a predetermined angle.

10. The machine-readable medium of claim 9, wherein the predetermined angle is five degrees.

11. A method for determining an operational status of a steering system that steers an object comprising the machine-implemented steps of:
generating a first positional signal of a target attached to the object with the object positioned at a first steering angle;
generating a second positional signal of the target with the object positioned at a second steering angle;
generating a third positional signal of the target with the object positioned at a third steering angle;
calculating a first positional parameter for the steering system based on the first and second positional signals;
calculating a second positional parameter for the steering system based on the second and third positional signals;
accessing reference positional parameters; and
determining an operational status of the steering system based on the first and second positional parameters, and the reference positional parameters.

12. The method of claim 11, wherein the steering system is a steering system of a vehicle having a multiple link suspension.

13. The method of claim 12, wherein the first and second positional parameters are caster values of the vehicle.

14. The machine-readable medium of claim 11, wherein both the difference between the first and second steering angles, and the difference between the second and third steering angles are smaller than a predetermined angle.

15. The machine-readable medium of claim 14, wherein the predetermined angle is five degrees.

16. A system for diagnosing a vehicle steering system that steers a wheel, comprising:
an image sensor for forming a viewing path with a target attached to the wheel and for generating positional signals of the target; and
a data processing system configured to couple to the image sensor, the data processing system including a data processor for processing data and a data storage device for storing data, wherein the data storage device bears instructions upon execution by the data processor causing the data processing system to perform the steps of:
receiving a first positional signal of the target with the wheel positioned at a first steering angle;
receiving a second positional signal of the target with the wheel positioned at a second steering angle;
receiving a third positional signal of the target with the wheel positioned at a third steering angle;
calculating a first positional parameter for the steering system based on the first and second positional signals;
calculating a second positional parameter for the steering system based on the second and third positional signals;
accessing reference positional parameters stored in the data storage device or from a remote data processing system; and
determining an operational status of the steering system based on the first and second positional parameters, and the reference positional parameters.

17. The system of claim 16, wherein the first and second positional parameters are caster values of the wheel.

18. The system of claim 17, wherein the reference positional parameters include reference caster values corresponding to various steering angles provided by the maker of the vehicle.

19. The system of claim 18, wherein the data storage device further bears instructions upon execution by the data processor causing the data processing system to perform the steps of:
designating the first positional parameter as the caster value corresponding to the first steering angle; and
designating the second positional parameter as the caster value corresponding to the second steering angle.

20. The system of claim 18, wherein the data storage device further bears instructions upon execution by the data processor causes the data processing system to perform the steps of:
designating the first positional parameter as the caster value corresponding to a first test angle, wherein the first test angle is a steering angle between the first and second steering angle, or substantially equal to either the first steering angle or the second steering angle; and designating the second positional parameter as the caster value corresponding to a second test angle, wherein the second test angle is a steering angle between the second and third steering angle, or substantially equal to either the second steering angle or the third steering angle.

21. The system of claim 19, wherein the determining step determines the operational status of the steering system based on the differences between the first positional parameter and a reference caster value corresponding to the first steering angle, and the difference between the second positional parameter and a reference caster value corresponding to the second steering angle.

22. The system of claim 21, wherein the steering system is determined as in a misalignment condition responsive to either the differences between the first positional parameter and the reference caster value corresponding to the first steering angle exceeding a threshold value, or the difference between the second positional parameter and the reference caster value corresponding to the second steering angle exceeding the threshold value.

23. The system of claim 16, wherein the angle between the first steering angle and the second steering angle, and the angle between the second steering angle and the third steering angle are smaller than or substantially equal to a predetermined angle.

24. The system of claim 23, wherein the predetermined angle is five degrees.

25. A data processing system configured to use with a position determination system to determine an operational status of a steering system having an object attached thereto, the position determination system comprising an optical sensing device for forming a viewing path with a target attached to the object and for generating positional signals of the target, the data processing system comprising:

a data processor processing data; and a storage device storing instructions upon execution by the data processor causing the data processing system to perform the steps of:

receiving positional signals of the target with the object steered to at least three steering angles;

calculating a first positional parameter and a second positional parameter for the steering system based on the positional signals;

designating the first positional parameter as the positional parameter corresponding to a first test angle;

designating the second positional parameter as the positional parameter corresponding to a second test angle;

accessing reference positional parameters, wherein the reference positional parameters include reference positional parameters for the first test angle and the second test angle; and determining an operational status of the steering system based on the first and second positional parameters, and the reference positional parameters for the first test angle and the second test angle.

26. A diagnostic system for determining an operational status of a steering system for steering an object attached thereto, the diagnostic system comprising:

means for obtaining positional signals related to the steering system; and data processing means for calculating positional parameters of the steering system based on the positional signals, the data processing means being configured to perform the machine-implemented steps of:

receiving a first, second and third positional signal of the steering system with the object positioned at a first, second and third steering angle respectively;

calculating a first positional parameter for the steering system based on the first and second positional signals;

calculating a second positional parameter for the steering system based on the second and third positional signals;

designating the first positional parameter as the positional parameter for a first test angle;

designating the second positional parameter as the positional parameter for a second test angle;

accessing reference positional parameters; and determining an operational status of the steering system based on the positional parameter for the first and second test angles, and the reference positional parameters.

27. The system of claim 26, wherein the multiple-link steering system is a steering system of a vehicle having a multiple link suspension.

28. The system of claim 27, wherein the first and second positional parameters are caster values of the vehicle.

29. The system of claim 26, wherein both the difference between the first and second steering angles, and the difference between the second and third steering angles are smaller than a predetermined angle.

30. The system of claim 29, wherein the predetermined angle is five degrees.

31. A diagnostic system for determining an operational status of a steering system for steering an object attached thereto, the diagnostic system comprising:

means for obtaining positional signals related to the steering system; and data processing means for calculating positional parameters of the steering system based on the positional signals, the data processing means being configured to perform the machine-implemented steps of:

receiving a first, second and third positional signal of the steering system when the object is steered from the first steering angle to the second steering angle, and then to the third steering angle, wherein the second steering angle is an angle between the first and third steering angle;

receiving a fourth and fifth positional signal of the steering system when the object is steered from the third steering angle to the second steering angle, and then to the first steering angle;

calculating a first positional parameter for the steering system based on the first and second positional signals;

calculating a second positional parameter for the steering system based on the second and third positional signals;

calculating a third positional parameter for the steering system based on the third and fourth positional signals;

calculating a fourth positional parameter for the steering system based on the fourth and fifth positional signals;

calculating a positional parameter corresponding to a first test angle based on the first and fourth positional parameters;

calculating a positional parameter corresponding to a second test angle based on the second and third positional parameters;

accessing reference positional parameters corresponding to the first and second test angles respectively; and determining an operational status of the steering system based on the positional parameters corresponding to the first and second test angles, and the reference positional parameters corresponding to the first and second test angles.

32. A diagnostic system for determining an operational status of a steering system for steering an object attached thereto, the diagnostic system comprising:

a position determination system for obtaining positional signals related to the steering system; and a data processing system for calculating positional parameters of the steering system based on the positional signals, the data processing system including instructions upon execution by the data processing system to control the data processing system to perform the machine-implemented steps of:

receiving positional signals of the steering system when the object is steered respectively to at least three steering angles;

calculating a positional parameter for the steering system corresponding to a first test angle and a second test angle respectively based on the positional signals;

accessing a reference positional parameter corresponding to the first and second test angles respectively; and determining an operational status of the steering system based on the positional parameter corresponding to the first and second test angles, and the reference positional parameter corresponding to the first and second test angles.

33. The system of claim 32, wherein the positional parameter is a caster value.

34. A diagnostic system for determining an operational status of a steering system for steering an object attached thereto, the diagnostic system comprising:

a position determination system for obtaining positional signals related to the steering system; and a data processing system for calculating positional parameters of the steering system based on the positional signals, the data processing system including instructions upon execution by the data processing system to control the data processing system to perform the machine-implemented steps of:

receiving positional signals of the steering system corresponding to at least three steering angles when the object is steered from a first steering angle to a second steering angle, wherein the at least three steering angles are between the first steering angle and the second steering angle;

calculating a positional parameter for the steering system corresponding to a first test angle and a second test angle respectively based on the positional signals;

accessing a reference positional parameter corresponding to the first and second test angles respectively; and determining an operational status of the steering system based on the positional parameter corresponding to the first and second test angles, and the reference positional parameter corresponding to the first and second test angles.

35. The system of claim 34, wherein the steering system is in a vehicle and the positional parameter is the caster.

36. A diagnostic system for determining an operational status of a steering system for steering an object attached thereto, the diagnostic system comprising:

a position determination system for obtaining positional signals related to the steering system; and a data processing system for calculating positional parameters of the steering system based on the positional signals, the data processing system including instructions upon execution by the data processing system to control the data processing system to perform the machine-implemented steps of:

receiving a first set of positional signals of the steering system corresponding to at least three steering angles when the object is steered in a first direction from a first steering angle to a second steering angle;

receiving a second set of positional signals of the steering system corresponding to at least three steering angles when the object is steered in a second direction from the second steering angle to a third steering angle;

calculating a positional parameter for the steering system corresponding to a first test angle and a second test angle respectively based on the first set of positional signals;

calculating the positional parameter for the steering system corresponding to a third test angle and a fourth test angle respectively based on the second set of positional signals;

accessing a reference positional parameter corresponding to the first, second, third and fourth test angles respectively; and determining an operational status of the steering system based on the positional parameter corresponding to the first, second, third and fourth test angles, and the reference positional parameter corresponding to the first, second, third and second test angles.

37. The system of claim 36, wherein the first test angle and the fourth test angle are substantially the same, and the second test angle and the third test angle are substantially the same.

38. The system of claim 37, wherein the data processing system further includes instructions upon execution by the data processing system to control the data processing system to perform the machine-implemented steps of:

calculating an average positional parameter for the first test angle or second test angle;

calculating an average positional parameter for the third or fourth test angle; and determining an operational status of the average positional parameter corresponding to the first or second test angle, the average positional parameter corresponding to the third or fourth test angle, the reference positional parameter corresponding to the first or second test angle, and the reference positional parameter corresponding third or fourth test angle.

39. A diagnostic system for determining the type of a steering system for steering an object attached thereto, the diagnostic system comprising:

a position determination system for obtaining positional signals related to the steering system; and a data processing system for calculating positional parameters of the steering system based on the positional signals, the data processing system including instructions upon execution by the data processing system to control the data processing system to perform the machine-implemented steps of:

receiving positional signals of the steering system corresponding to at least three steering angles when the object is steered from a first steering angle to a second steering angle, wherein the at least three steering angles are between the first steering angle and the second steering angle;

calculating a positional parameter for the steering system corresponding to a first test angle and a second test angle respectively based on the positional signals;

evaluating whether the positional parameter corresponding to the first test angle and the positional parameter corresponding to the second test angle are substantially the same; and determining the type of the steering system based on the result of the evaluating step.

40. The system of claim 39, wherein the steering system is determined as a non-multiple-link steering system if the positional parameter corresponding to the first test angle and the positional parameter corresponding to the second test angle are substantially the same.

41. The system of claim 39, wherein the steering system is determined as a multiple-link steering system if the positional parameter corresponding to the first test angle and the positional parameter corresponding to the second test angle are not substantially the same.

42. A diagnostic system for determining an operational status of a steering system for steering an object attached thereto, the diagnostic system comprising:

a position determination system for obtaining positional signals related to the steering system; and a data processing system for calculating positional parameters of the steering system based on the positional signals, the data processing system including instructions upon execution by the data processing system to control the data processing system to perform the machine-implemented steps of:

receiving positional signals of the steering system with the object positioned at a first steering angle and at a second steering angle, wherein the first and second steering angles are on opposite side of the straight ahead position, and the difference between the first and second steering angles is less than 8 degrees;

calculating a positional parameter for the steering system based on the positional signals;

accessing a reference positional parameter for the steering system; and determining an operational status of the steering system based on the calculated positional parameter and the reference positional parameter.

43. The system of claim 42, wherein the difference between the first and second steering angle is no more than 2 degrees.

44. The system of claim 42, wherein the positional parameter is related to a steering axis.

45. The system of claim 44, wherein the steering system is used in a vehicle and the positional parameter is the caster.

46. A data processing system configured to use with a position determination system to determine an operational status of a steering system to steer an object attached thereto, the position determination system is configured to generate positional signals of the steering system, the data processing system comprising:

receiving positional signals of the steering system corresponding to at least three steering angles when the object is steered from a first steering angle to a second steering angle, wherein the at least three steering angles are between the first steering angle and the second steering angle;

calculating a positional parameter for the steering system corresponding to a first test angle and a second test angle respectively based on the positional signals;

accessing a reference positional parameter corresponding to the first and second test angles respectively; and determining an operational status of the steering system based on the positional parameter corresponding to the first and second test angles, and the reference positional parameter corresponding to the first and second test angles.

47. The system of claim 46, wherein the positional parameter is related to a steering axis.

48. The system of claim 47, wherein the steering system is in a vehicle and the positional parameter is the caster.

* * * * *